Figure 12:
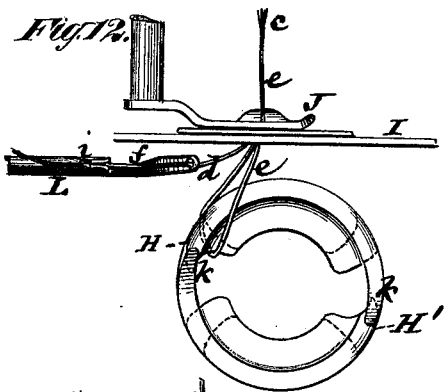

4 Sheets—Sheet 1.
J. McCLOSKEY.
Sewing-Machine.
No. 202,738. Patented April 23, 1878.
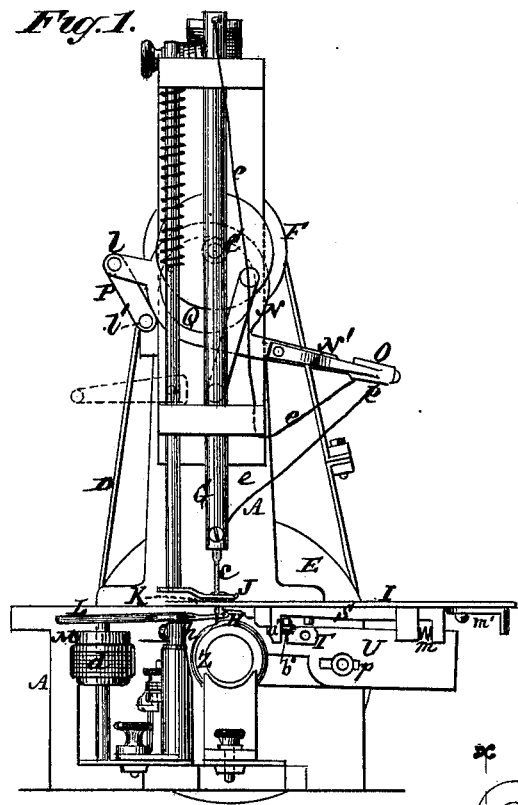
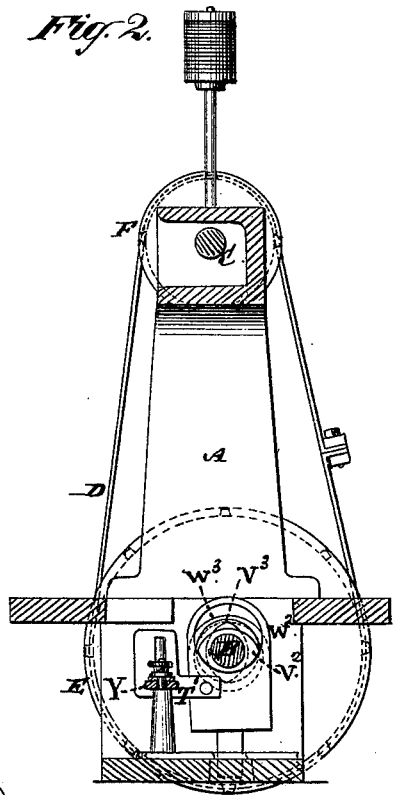
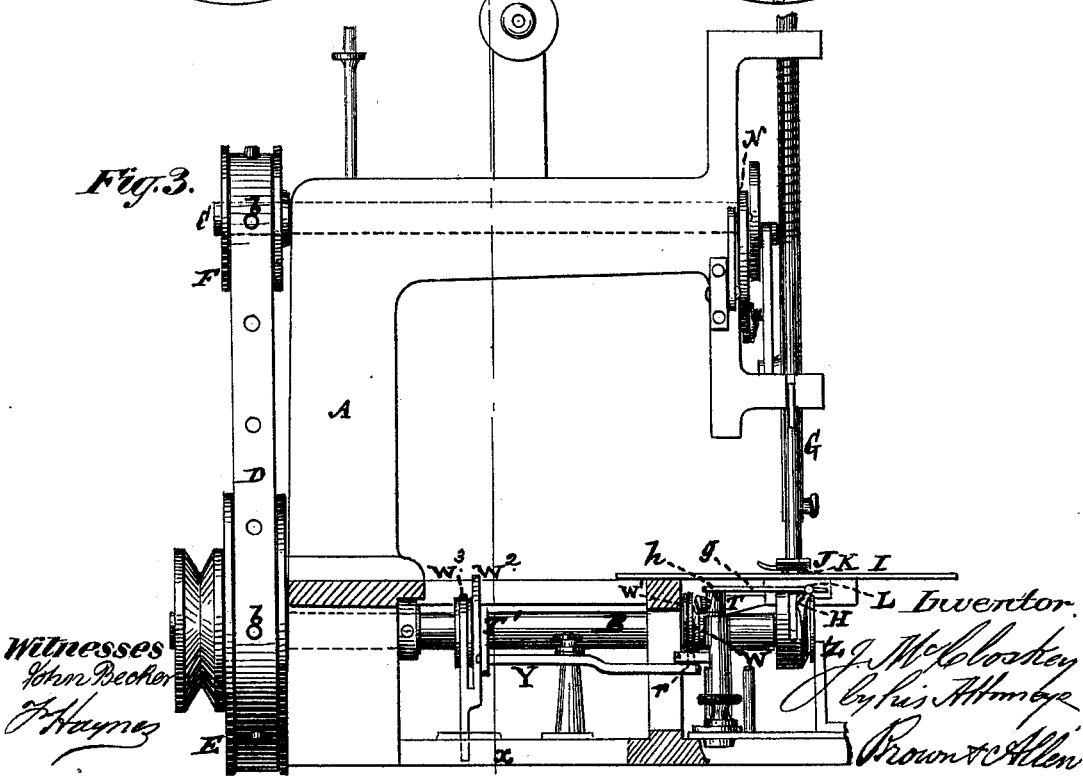
N. PETERS, PHOTO-LITHOGRAPHER, WASHINGTON, D.C.

4 Sheets—Sheet 2.
J. McCLOSKEY.
Sewing-Machine.
No. 202,738. Patented April 23, 1878.
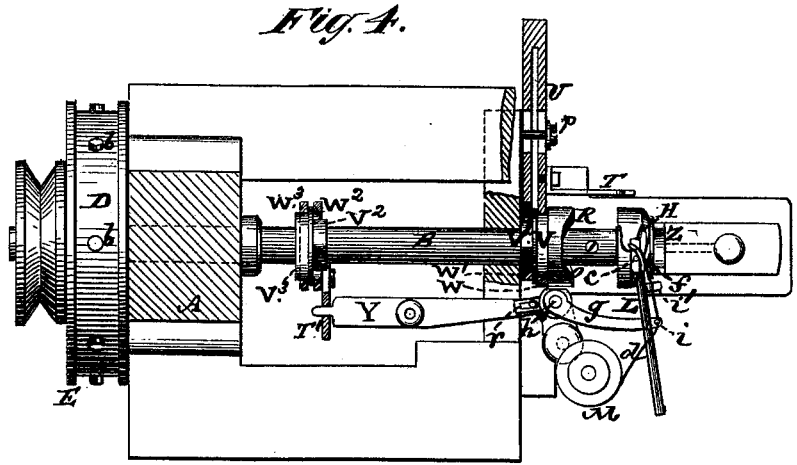
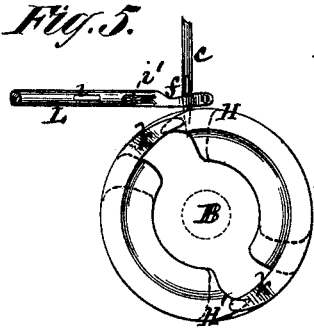
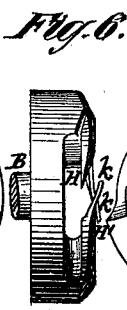
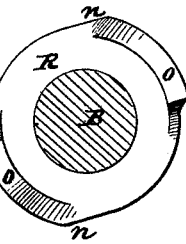
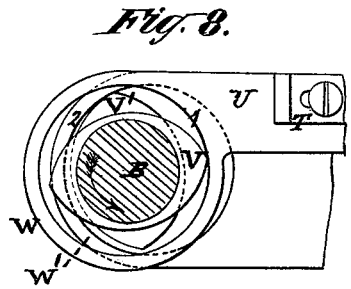
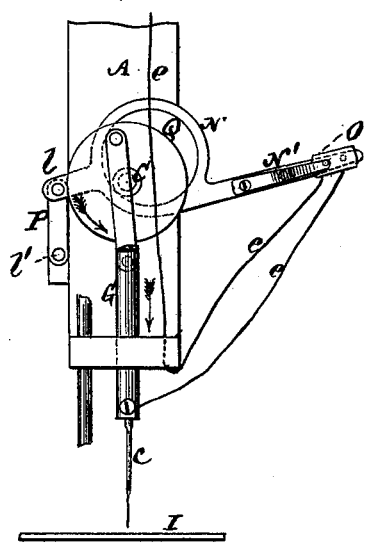
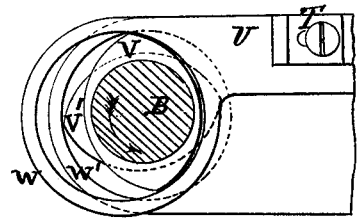
Witnesses
John Becker
Fred Haynes
Inventor
J. McCloskey
by his Attorneys
Brown & Allen 4 Sheets—Sheet 3.

J. McCLOSKEY.
Sewing-Machine.

No. 202,738.   Patented April 23, 1878.

Witnesses.
John Becker
Fred. Haynes

Inventor.
J. McCloskey
by his Attorneys,
Brown & Allen

N. PETERS, PHOTO-LITHOGRAPHER, WASHINGTON, D. C.

J. McCLOSKEY.
Sewing-Machine.

No. 202,738. Patented April 23, 1878.

Witnesses:
A. A. Seatman
J. R. Nottingham

Inventor:
John McCloskey
per
James A Whitney
atty.

UNITED STATES PATENT OFFICE.

JOHN McCLOSKEY, OF NEW YORK, N. Y.

IMPROVEMENT IN SEWING-MACHINES.

Specification forming part of Letters Patent No. 202,738, dated April 23, 1878; application filed June 5, 1875.

*To all whom it may concern:*

Be it known that I, JOHN McCLOSKEY, of the city, county, and State of New York, have invented certain new and useful Improvements in Sewing-Machines; and I do hereby declare that the following is a full, clear, and exact description of the same, reference being had to the accompanying drawing, which forms part of this specification.

This invention relates to a machine for producing a stitch by the interlocking of two independent threads, the loop of a secondary thread being passed through the loop of a needle-thread, and the interlocking of said loops secured by a succeeding loop of the needle-thread; and it consists, first, in a revolving double hook, made fast to or in one piece with its shaft, and having its hooks or hooked portions arranged to project in the same circular direction for successive operation, in combination with a reciprocating or vibratory needle, substantially as described, whereby the loop is caused to pass the hook only on its face, and the nose of the hook shall hold the loop until the cast-off of the hook is reached by the back thread of the loop, in order that both threads of the loop shall pass over the face of the hook, and the loop then slip back reversely from the nose, as more fully hereinafter set forth; second, in a revolving double hook, constructed with outwardly-projecting wings or guards in the rear of its hooked portions, or hooks proper, as more fully hereinafter specified; third, in a revolving double hook, rigidly fixed upon its shaft, in combination with a bobbin, an eye-pointed needle, and connecting mechanism for operating said parts in unison, whereby the needle is caused to make two descents to one rotation of the said double hook and form a lock-stitch; fourth, in a bowed thread carrier or looper, constructed with an eye at its forward end, for the passage of its thread in a loop form through the loop of the needle-thread, in combination with a rotary hook, a reciprocating or vibratory needle, and operating mechanism, whereby, in its operation, a forward and inward and an outward and backward motion of the thread-carrier, with reference to the needle and rotary hook, are secured, as more fully hereinafter described; fifth, in the combination of a revolving double hook, a sewing-needle, a reciprocating secondary thread carrier or looper, a feeding dog or device, and operating mechanism, whereby the proper motions are imparted to the devices for forming the stitches, as more fully hereinafter specified; sixth, in the combination, for the purpose of actuating the feed, of two cams, having their longer axes at an angle to each other, with a compound strap, as hereinafter more fully set forth; seventh, in the combination, with two cams, having their longer axes at an angle to one another, of a compound strap, a lever, and the secondary thread-carrier, as more fully hereinafter set forth; eighth, in a needle-thread take-up, attached in its rear to a rocking arm, in combination with an eccentric on the needle-shaft, as more fully hereinafter specified; ninth, in combination with the needle-thread take-up, a spring-tension device, as more fully hereinafter described.

Figure 13:
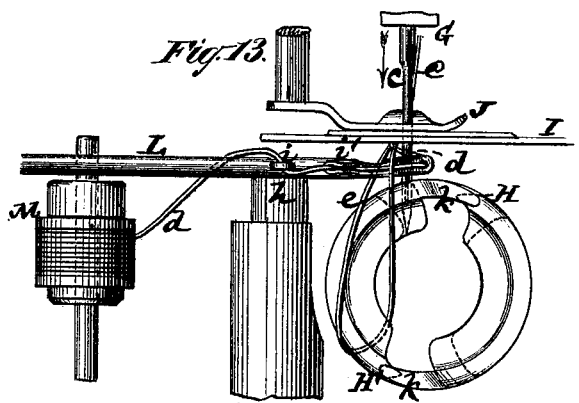
Figure 15:
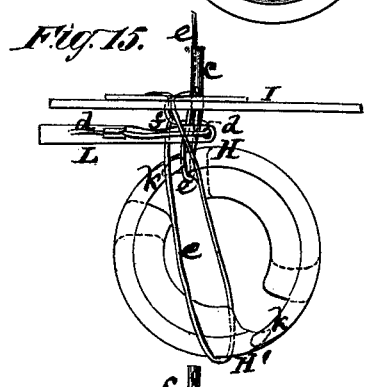
Figure 14:
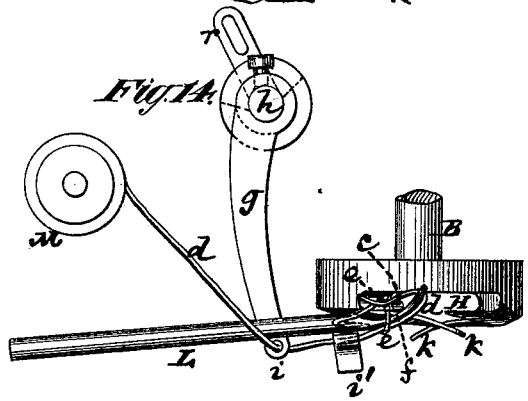
Figure 16:
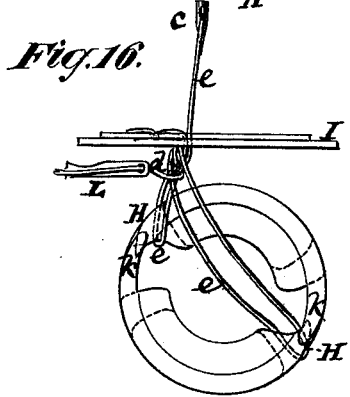
Figure 17:
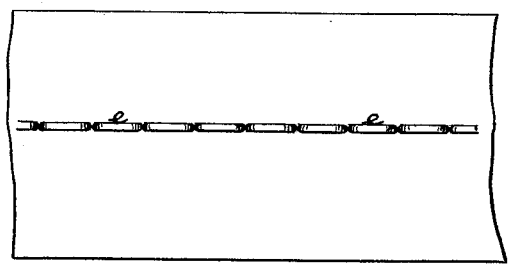
Figure 18:
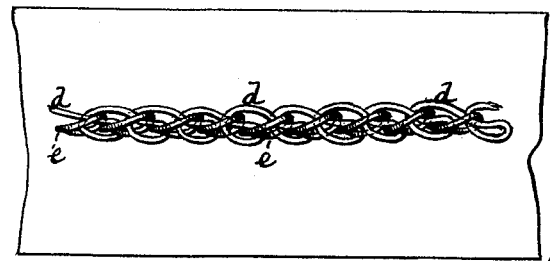
Figure 19:
Figure 20:
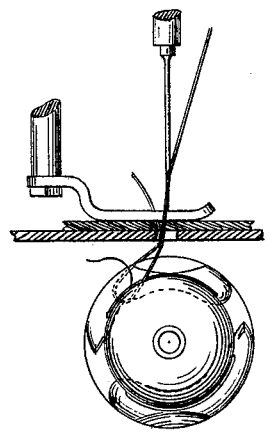
Figure 21:
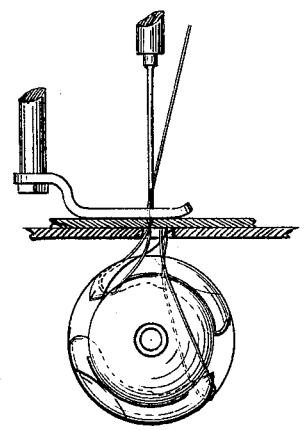
Figure 22:
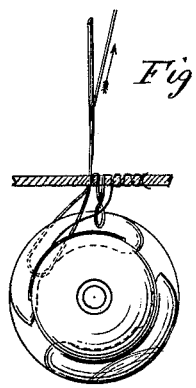
Figure 23:

In the drawings, Figure 1 represents a front elevation of a sewing-machine constructed in accordance with my invention; Fig. 2, a vertical transverse section of the same on the line *x x* of Fig. 3; Fig. 3, a partially-broken side view of the apparatus, showing a portion of the same in section; Fig. 4, a horizontal section of the same with the cloth-plate or table removed; Fig. 5, a face view of a revolving double hook, in connection with a sewing-needle and independent secondary thread carrier and looper; Fig. 6, a side or edge view of said hook; Fig. 7, a face view of the feed-cam; Figs. 8 and 9, front views of a compound cam and compound strap, used in connection with the feed, showing the same in different positions; Fig. 10, a front elevation, in part, illustrating the needle-thread take-up; Fig. 11, a horizontal section of the same at the bearing of the needle-driving shaft. Fig. 12 is a face view of the revolving double hook, showing its relation to the needle and secondary thread carrier or looper when the needle is in a raised position and the hook is drawing on the needle-thread loop. Fig. 13 is a similar view, but showing the parts in an advanced position. Fig. 14 is a plan thereof. Figs. 15 and 16 are further similar views of like parts in still further and succeeding advanced positions. Figs. 17, 18, and 19 are opposite face views and an edge view, respectively, of the interlooped stitch produced by the machine; and Figs. 20, 21, and 22 represent views of a modification of my invention for forming a lock-stitch; and Fig. 23, a view of the lock-stitch formed by said modification.

The letter A represents the frame of the machine; and B a shaft, carrying at its forward end the revolving hook, and which may also be the driving-shaft of the machine. The letter C represents the shaft which operates the needle-bar. Said shaft C is arranged to run at double the velocity of the shaft B, and derives its motion from the latter through the medium of instrumentalities which should be such as to transmit a smooth and positive motion from the driving-shaft to the needle-actuating shaft, and to insure an absolutely reliable unison in the movements of the stitch-forming mechanism. The instrumentalities I employ for this purpose in the present instance consist of a flexible non-extensible metallic belt, D, which passes around pulleys E F, bearing the proportion of two to one, and provided with spurs or studs b, extending radially from the peripheries of the pulleys and engaging corresponding perforations in the belt, which perforations, if desired, may be so struck or formed that their blanks, instead of being cut entirely out, may be turned down outwardly to give a broader bearing to the studs. The belt may be lined, or the pulleys covered with leather, or other material.

By giving the shaft C double the velocity of the shaft B, the needle-bar G, carrying the sewing-needle C, makes two up-and-down strokes for each complete revolution of the revolving hook-shaft B, which carries at its forward end a double hook, H H', the hooked portions of which project and simultaneously move in the same circular direction, and successively catch and draw on the succeeding loops of the needle-thread. This enables me to make two stitches for one, as compared with a single revolving hook, for a given rotation or velocity of the hook-shaft, which latter may accordingly be driven at a slow or convenient treadle-speed when a treadle-motion is applied to it.

The letter I represents the cloth bed or table of the machine, and J the presser-foot thereof. K represents the feeding-dog, and L the secondary carrier or looper, the latter working a thread, d, while the sewing-needle operates a thread, e. The thread carrier or looper L consists of a bar, which is bowed, as at f, and formed with an eye at its forward end. Said bar is reciprocated, preferably, by means of an oscillating arm, g, of a vertical shaft, h. The said thread carrier or looper is arranged to travel at its bowed or crooked portion f in front of the needle c, and so that the latter enters between it and the thread carried by said looper, which latter operates altogether independently of the needle-thread—that is to say, takes no hold on the latter; and said secondary thread carrier or looper L has its thread d passed through an eye, i, and through a spring-tension, i', on the body of the looper, and from thence through an eye at the front end of the crooked or bowed portion f, to form the loop which passes through the loop of the needle-thread.

The secondary thread carrier or looper L, as also the feeding-dog K, have each two forward movements for every revolution of the shaft B, to accord or act in unison with the revolving double hook H H' on said shaft. The means by which these movements are given will be hereinafter described.

In the operation of the stitching devices, each time the sewing-needle c comes down and afterward ascends, leaving a loop behind it, one of the hooks H H' of the revolving double hook catches and draws on said loop, as shown in Fig. 12; and on the succeeding descent of the needle, and, in fact, on each descent of the latter, the thread-carrier L comes forward through the needle-thread loop, so that the needle, with the portion of its thread which forms the succeeding loop, and which in due course is caught by the other hook, H or H', passes, as represented in Figs. 13 and 14, down the inside or back of the bowed or crooked portion f of the looper L, and between it and the thread carried by said looper. By this means the two threads are interlaced or interlocked, as clearly shown in Figs. 15 and 16 of the drawings, for the succeeding operations of the stitching devices, the whole being subject to the requisite tension and feed of the fabric each time the needle is raised to complete or tighten the stitch as the interlaced loops are cast from the revolving hook. Each hooked portion or hook proper of the double hook H H' is constructed with a wing or guard, k, extending in its rear and flaring outward, to prevent the loop which is being cast off from being accidentally caught by the succeeding hook in its wake. No brush or pad to act as a check or detainer of the needle-thread loop is, consequently, necessary.

The take-up of the needle-thread e consists of an eccentric ring, N, carrying an arm, N', through one or more eyes in the outer end of which latter the needle-thread is passed, and may be controlled at such point by an adjustable tension spring or device, O. Said take-up operates not only with an up-and-down, but forward-and-backward, motion, by attachment in its rear, as at l, to a rocking arm, P, having its center of motion at l', an eccentric, Q, on the needle-shaft C, within the ring N, actuating the take-up, the outer or thread-controlling end of which has, by the actions above described, an elliptic-like movement.

The feed, which is a four-motion one, is here represented as being made capable of being changed, so as either to feed the cloth in a transverse relation with the shaft B, or in a parallel relation therewith from back to front of the machine, to which end the cloth plate or bed I is made capable of being turned about to suit such changes in the direction of the feed, and has attached to it the slide which carries the rising and falling feeding-dog K, the presser-foot J being constructed with a lateral turned-up portion, to adapt it to a changed direction of the feed, all as described in another application for a patent filed by me June 5, 1876.

R is the feed-cam on the shaft B, by which upward motion is communicated to the feeding-dog K, as also forward motion thereto through the slide S, as against the weight of the feeding-dog and one or more springs, $m$, by which the downward and backward movement of the feeding-dog is effected. This is when the feed is required to be in a direction parallel with the shaft B, and to give the two feeding-strokes for each revolution of the shaft B, so as to adapt the feed to the double revolving hook H H'. Said cam R is provided with opposite swells or rises $n$ $n$ on its peripheries, to give the lift to the dog, and two oppositely-arranged beveled or spiral projections, $o$ $o$, on the face of the cam, to give the feeding-dog K its forward stroke.

When the feed is required to be in a direction transverse to shaft B, then the necessary movement is produced by instrumentalities which will now be described.

The slide S, that carries the feed dog or bar K, is arranged to move back and forth in guides on the under side of the cloth-plate I. The feed dog or bar is pivoted or otherwise attached to the slide, so as to be capable of moving up and down independently of the slide. A spring, $m$, interposed between the end of the slide and its rear fixed guide, tends to press the slide backward, the extent of this backward movement being determined by a cam-lever, $m'$, of ordinary or suitable construction, which regulates the length of feed-movement.

An arm, T, extending from the compound strap, hereinafter referred to, lies in rear of a shoulder, $a'$, on the feed-dog and above a pin, $b'$, projecting rearwardly from the shoulder. This arm, which receives positive movement from the compound strap, imparts that movement in three directions—viz., up, forward, and down—to the feed-dog. The backward movement is obtained from the spring.

The arm T is attached to the forward end of a compound strap, U, which, by a free pin-and-slot connection, $p$, by which it is attached to some fixed part of the machine, is at liberty not only to rise and fall in oscillating on the pin, but also to move bodily to and fro in the line of the slot. This compound movement is imparted as follows: The strap U, which may be divided longitudinally, but is virtually a single bar, is operated by a compound cam, consisting of two cams, V V$^1$, on the shaft B, placed so that their longer axes are at an angle to one another, and arranged to work in rings W W$^1$, forming part of the strap U.

The action of these parts will be understood by reference to Figs. 3 and 4.

When the shaft B is revolved in the direction of the arrow in Fig. 8, the rear end of cam V, working against the surface 1 of its ring W, tends to raise the strap; at the same time the upper end of cam V$^1$, moving against the surface 2 of its ring W$^1$, tends to move the strap forward or to the left. This action continues until the parts are brought to the position shown in Fig. 9, at which time they have made a quarter-revolution. On further revolution of the cams, the lower end of the cam V now acts to move the strap backward, while the front end (or the left-hand end) of cam V$^1$ acts to move the strap downward. This continues until the cams have made another quarter-revolution, at which time they reassume the position shown in Fig. 8. Thus when one cam acts to move the strap up or down, the other acts to move it forward or backward, and each cam acts alternately in either capacity.

Under the organization described, it will be noted that two complete feed-movements are accomplished during each revolution of shaft B. This is incidental to the organization of the particular machine herein represented, inasmuch as the needle is arranged to make two descents for each revolution of shaft B, and consequently the cams are in the form of double cams. It will, however, be readily understood that by the exercise of ordinary mechanical judgment and skill the two cams and the compound strap may be so formed and combined as to give only one complete up-and-down and back-and-forth movement to the strap at each revolution.

The needle shaft or bar will, of course, be geared so as to move at a corresponding rate, to insure one reciprocation of the needle to each complete feed-movement.

The interval between the starting of the upward movement and the starting of the forward movement, and in like manner the starting of the downward movement and the starting of the backward movement, will depend upon the angle at which the cams are set to each other, and the relative position of their bearings in the compound strap.

The movement of the compound strap, as above described, is wholly positive. It is, however, optional how much of that positive movement shall be communicated to the feed-dog. The connection between the strap and feed-dog may obviously be such as will insure a positive movement of the dog in all four directions. Or the connection may be varied—as, for instance, in the manner shown in the drawing—whereby a spring is used to supplement the action of the strap on the feed-dog. This spring may tend to press the feed-dog not only backward, but downward as well; or a separate spring may be used to give a downward tendency to the dog.

I remark, also, that the cams and compound strap may obviously be so proportioned and combined that the strap will be moved positively in an upward and forward direction only, these being the directions in which a positive movement is important for the feed. In this case the cams would act upon the compound strap only along the surfaces or bearing-faces 1 and 2 of the same, and a spring or other instrumentality could readily be used to supplement the action of the cams. All parts of the strap, however, move bodily and together under all conditions, having, as hereinbefore stated, an oscillatory to-and-fro movement upon the pin $p$ as a pivot and guide. It is also obvious that the shape of the parts of the strap that encircle the cams may be other than circular or annular.

A similar mechanical movement is employed to give the necessary double strokes to the secondary thread carrier or looper L, consisting of a double cam, composed of the reverse cams $V^2$ $V^3$ on the shaft B, and operating in or on a compound strap consisting of the reversely-set cam-rings $W^2$ $W^3$, which are guided in an up-and-down direction, with freedom to move laterally, and have attached to them a slotted rocking arm, T', which serves, through the instrumentality of a horizontal lever, Y, to give the necessary double stroke—that is, twice forward and twice backward—to the secondary thread carrier or looper L for each revolution of the shaft B, when the latter carries a double hook, H H', as described. This is rapidly effected by a pin and slotted arm connection, $r$, of the lever Y at its forward end with the shaft $h$ of the secondary thread carrier or looper L.

When it is required to produce a straight or ordinary locked thread-stitch, the secondary thread carrier or looper L is dispensed with or thrown out of action, and a bobbin carrying an independent thread introduced within the double hook H H', and held in place by an ordinary bobbin-ring, Z, for action as in other lock-stitch sewing-machines; but, by reason of the two successive operating hooks H H', twice the amount of sewing will be accomplished by a given number of revolutions of the shaft B carrying the hooks. Or, if it be desired to produce a lock embroidery-stitch, both the secondary thread carrier or looper L and the bobbin, carrying an independent thread, may be brought into action together, and, with the needle-thread, will produce a stitch composed of three threads.

In conclusion, I would state that I do not here claim, broadly, a mechanical movement composed of the two cams in combination with the compound strap. This I intend making the subject of separate Letters Patent.

What I claim, and desire to secure by Letters Patent, is—

1. In a sewing-machine, a revolving double hook made fast to or in one piece with its shaft, and having its hooks or hooked portions arranged to project in the same circular direction for successive operation, in combination with a reciprocating or vibrating needle, whereby the loop is caused to pass the hook only on its face, and the nose of the hook shall hold the loop until the cast-off of the hook is reached by the back thread of the loop, in order that both threads of the loop shall pass over the face of the hook, and the loop then slip back reversely from the nose, all substantially as and for the purpose set forth.

2. The revolving double hook H H', constructed with outwardly-projecting wings or guards $k$ in the rear of its hooked portions or hooks proper, essentially as and for the purposes herein set forth.

3. In a sewing-machine, a revolving double hook, rigidly fixed upon its shaft, in combination with a bobbin, an eye-pointed needle, and connecting mechanism for operating the said parts in unison, whereby the needle is caused to make two descents to one rotation of the said double hook and form a lock-stitch.

4. A thread carrier or looper, L, bowed at $f$, and constructed with an eye at its forward end for passage of its thread in a loop form through the loop of the needle-thread, in combination with a rotary hook, a reciprocating or vibrating needle, and operating mechanism whereby in its operation a forward and inward motion and an outward and backward motion of the thread-carrier with reference to the needle and rotary hook are secured, substantially as and for the purpose set forth.

5. The combination of the revolving double hook H H', the sewing-needle C, reciprocating secondary thread carrier or looper L, and a feeding dog or device, and operating mechanism, substantially as described, whereby the proper motions are imparted to the said devices, as set forth.

6. In a sewing-machine feed, the combination of two cams, having their longer axes at an angle to one another, and a compound strap, which receives positive rising and forward movement from said cams, and operates to give like movement to the feed-dog, substantially as set forth.

7. In a sewing-machine feed, the combination, substantially as set forth, of two cams, having their longer axes at an angle to one another, and a compound strap, which receives positive up-and-down and to-and-fro movement from said cams, and operates to give motion to the feed-dog.

8. In a sewing-machine feed, the combination, with the feed-bar and a spring, which tends to move the same backward or backward and downward, of two cams, having their longer axes at an angle to each other, and a compound strap, which receives positive movement from said cams and operates the feed-bar against the stress of the spring, substantially as set forth.

9. In a sewing-machine, the combination, with the feed-actuating shaft, of the compound cam, the corresponding compound strap, the feed-dog, and connecting mechanism, whereby two complete feeding movements are effected by one revolution of the shaft.

10. The compound cam $V^2$ $V^3$, in combination with the compound strap W² W³ T', the lever Y, and the reciprocating secondary thread-carrier L, substantially as described.

11. The needle-thread take-up N N', attached in its rear to a rocking arm, P, and in combination with an eccentric, Q, on the needle-shaft, essentially as described.

12. In combination with the needle-thread take-up N', the spring device O, substantially as and for the purpose set forth.

JOHN McCLOSKEY.

Witnesses:
BENJAMIN W. HOFFMAN,
FRED. HAYNES.